(12) United States Patent
Crandall-Seibert et al.

(10) Patent No.: US 10,031,546 B2
(45) Date of Patent: Jul. 24, 2018

(54) VISUAL FAILURE INDICATION FOR SELECTOR LEVER

(71) Applicant: Hamilton Sundstrand Corporation, Windsor Locks, CT (US)

(72) Inventors: Cory M. Crandall-Seibert, Roscoe, IL (US); Andrew N. Baines, Rockton, IL (US); Timothy Michael Mayer, Belvidere, IL (US); Gary L. Voss, Bryon, IL (US); Sean Bradshaw, Rockford, IL (US); Roger F. Glenn, South Beloit, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 974 days.

(21) Appl. No.: 14/495,030

(22) Filed: Sep. 24, 2014

(65) Prior Publication Data

US 2016/0085259 A1   Mar. 24, 2016

(51) Int. Cl.
*G05G 25/00* (2006.01)
*B64C 13/14* (2006.01)
(Continued)

(52) U.S. Cl.
CPC ............ *G05G 25/00* (2013.01); *B64C 13/14* (2013.01); *B64D 45/0005* (2013.01); *G05G 1/04* (2013.01); *G05G 1/06* (2013.01); *G05G 5/06* (2013.01)

(58) Field of Classification Search
CPC ............ G01G 1/015; G01G 1/04; G01G 1/06; G05G 5/06; G05G 5/14; G05G 5/20; G05G 15/00; B64C 13/00; B64C 13/02; B64C 13/04; B64C 13/10; B64C 13/503; B64D 45/0005
See application file for complete search history.

(56) References Cited

U.S. PATENT DOCUMENTS

| 1,987,066 A | 1/1935 | Earie |
| 4,012,015 A | 3/1977 | Nelson et al. |
(Continued)

FOREIGN PATENT DOCUMENTS

WO    2014084809 A1   6/2014

OTHER PUBLICATIONS

European Search Report, European Application No./Patent No. 16197586.7-1757, dated Feb. 15, 2017, European Patent Office; 6 pages.
(Continued)

*Primary Examiner* — Richard W Ridley
*Assistant Examiner* — Brian J McGovern
(74) *Attorney, Agent, or Firm* — Cantor Colburn LLP

(57) ABSTRACT

A selector lever that comprises a shaft rotatably attached to a pivot and arranged between two detent plates, each of the detent plates having a plurality of slots arranged for receiving a detent pin located on the shaft. Each of the plurality of slots on each of the two detent plates is defined by a radial depth. One or more of the plurality of slots is a failure detection slot having an extended radial depth. When one of the detent pins has failed, the opposing detent pin is allowed to travel into the extended radial depth when placed in the failure detection slot. This action reveals a failure indicator, providing a visual indication that one of the detent pins has failed.

4 Claims, 13 Drawing Sheets

(51) Int. Cl.
   *G05G 1/04*    (2006.01)
   *G05G 5/06*    (2006.01)
   *B64D 45/00*   (2006.01)
   *G05G 1/06*    (2006.01)

(56) References Cited

U.S. PATENT DOCUMENTS

| | | |
|---|---|---|
| 4,126,054 A | 11/1978 | Langford et al. |
| 5,085,096 A | 2/1992 | Behrens |
| 5,973,593 A * | 10/1999 | Botella .................. F16H 63/42 |
| | | 116/28.1 |
| 6,168,181 B1 * | 1/2001 | Gadd ....................... B60D 1/36 |
| | | 116/28 R |
| 6,244,207 B1 * | 6/2001 | Chen ...................... B62K 23/04 |
| | | 116/28.1 |
| 2012/0180595 A1 * | 7/2012 | Baic ........................ G05G 5/06 |
| | | 74/501.6 |
| 2014/0116194 A1 | 5/2014 | Nieman |

OTHER PUBLICATIONS

International Search Report;International Application No. 15186648.0-1757, dated Feb. 5, 2016; European Patent Office; International Search Report, 7 pages.

\* cited by examiner

VISUAL FAILURE INDICATION FOR SELECTOR LEVER

BACKGROUND OF THE INVENTION

The present disclosure relates generally to selector levers and, more particularly, to a failure detection mechanism for selector levers that may be found, for example, in the cockpit of an aircraft.

Conventional aircraft are commonly equipped with a selector lever for manually controlling the actuation of flaps, ailerons, or other moveable features of the aircraft. The selector lever is mounted in the cockpit for the pilot to select the desired equipment configuration by moving the lever to a position corresponding to the desired equipment configuration. The conventional selector lever is typically constructed with a shaft rotatably arranged adjacent one or two detent plates. One or two detent pins corresponding to the detent plates are movably arranged on the shaft. This configuration provides a measure of redundancy that allows the selector lever to be functional after one detent pin has failed. The ability to detect the failure of one or both detent pins would reduce maintenance costs and improve aircraft safety. Accordingly, the industry is receptive to new developments that provide the capability to detect the failure of a detent pin.

SUMMARY OF THE INVENTION

Disclosed herein is a selector lever that includes a shaft rotatably attached to a pivot. The pivot is disposed in a housing and the shaft extends from the housing. A slide is movably arranged on the shaft. First and second detent pins are operatively connected to the slide. A first detent plate is disposed in the housing having a first plurality of slots for receiving the first detent pin, each of the first plurality of slots having a first radial depth. At least one of the first plurality of slots is a first failure detection slot defined by a first extended radial depth that is greater than the first radial depth. A second detent plate is disposed in the housing having a second plurality of slots for receiving the second detent pin. At least one of the second plurality of slots is a second failure detection slot defined by a second extended radial depth that is greater than the second radial depth. A failure indicator is arranged to provide a visual indication when the either of the first or second detent pins enters the first or second extended radial depths, respectively.

Another aspect of the disclosure provides a selector lever for actuating features of an aircraft. The selector lever includes a housing with a pivot disposed in the housing. A shaft is also arranged in the housing, a proximal end of the shaft being rotatably attached to the pivot with a distal end of the shaft extending from the housing. A slide is arranged to move along the shaft with first and second detent pins connected to the slide. A first detent plate is disposed in the housing having a first plurality of slots for receiving the first detent pin, each of the first plurality of slots having a first radial depth. At least one of the first plurality of slots is a first failure detection slot defined by a first extended radial depth that is greater than the first radial depth. A second detent plate is disposed in the housing having a second plurality of slots for receiving the second detent pin. A failure indicator is configured to provide a visual indication when the first pin is placed in the first failure detection slot

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures. It is to be understood that other embodiments may be utilized and changes may be made without departing from the scope of the present disclosure. In particular, the disclosure provides various examples related to a selector lever for aircraft, whereas the advantages of the present disclosure as applied in a related field would be apparent to one having ordinary skill in the art and are considered to be within the scope of the present invention.

Figure 1:
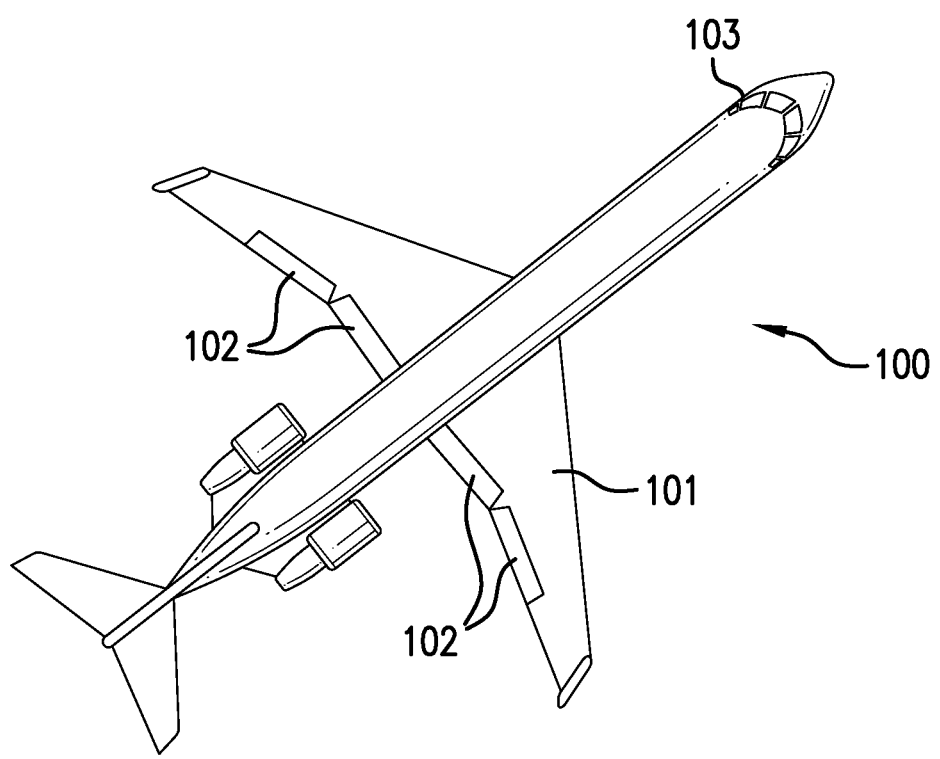
FIG. 1 is an illustration of an aircraft according to one embodiment.

FIG. 1 shows a top view of an aircraft 100 having an aircraft actuator system that employs the selector lever of the present disclosure. For example, the selector lever of the aircraft actuator system may be used to control the position of a plurality of flaps 102 located on the wings 101 of the aircraft 100. The selector lever allows the operator (or pilot) to accurately control the position of the flaps 102 from the cockpit 103.

Figure 2A:
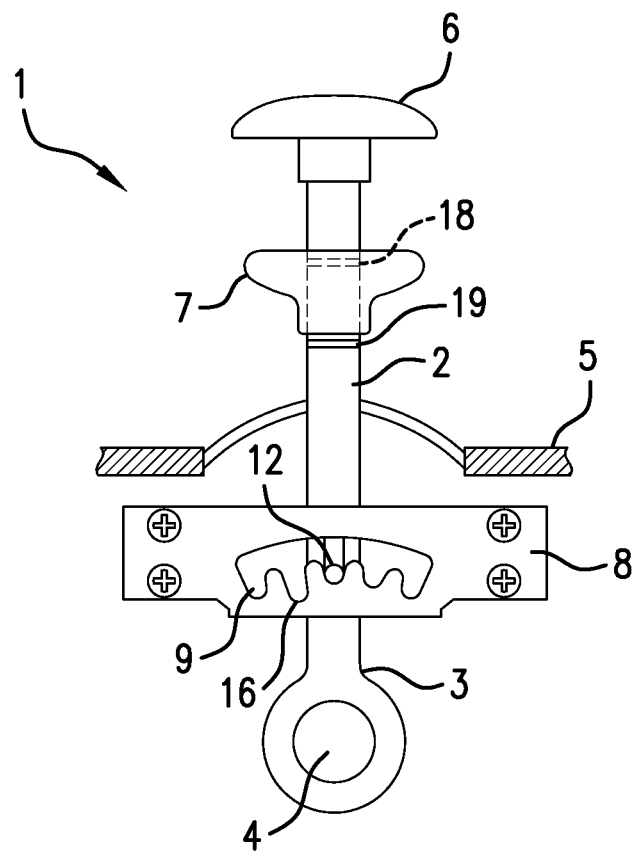
FIGS. 2A and 2B are opposing sectioned side views of a selector lever according to another embodiment.
Figure 2B:
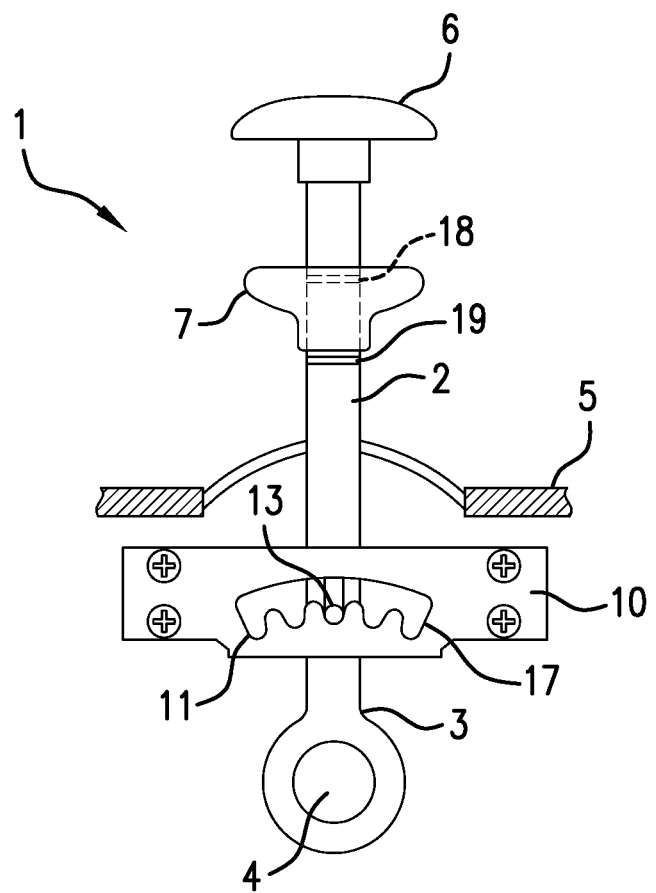

FIG. 2A is a sectioned side view of a selector lever 1 according to one embodiment of the present disclosure. FIG. 2B is a sectioned side view of the selector lever 1 shown in FIG. 2A, from an opposing view. The selector lever 1 includes a shaft 2 having a proximal end 3 that is rotatably attached to a pivot 4 that is disposed in a housing 5. The shaft 2 also comprises a distal end 6 that extends from the housing 5. A slide 7 is arranged to move along the shaft 2, the slide 7 at least partially extending from the housing 5.

FIG. 2A shows a first detent plate 8 with a first plurality of slots 9 disposed in the housing 5 parallel to the path of the pivoting shaft 2. FIG. 2B shows a second detent plate 10 with a second plurality of slots 11 disposed in the housing 5 parallel to the path of the pivoting shaft 2, opposite from the first detent plate 8.

FIG. 2A shows a first detent pin 12 arranged on the shaft 2 to engage the first plurality of slots 9 of the first detent plate 8. The first detent pin 12 is operatively connected to the slide 7 such that translational movement of the slide 7 along the shaft results in movement of the first detent pin 12. Similarly, FIG. 2B shows a second detent pin 13 arranged on the shaft 2 to engage the second plurality of slots 11 of the second detent plate 10, the second detent pin 13 being operatively connected to the slide 7.

Figure 2C:
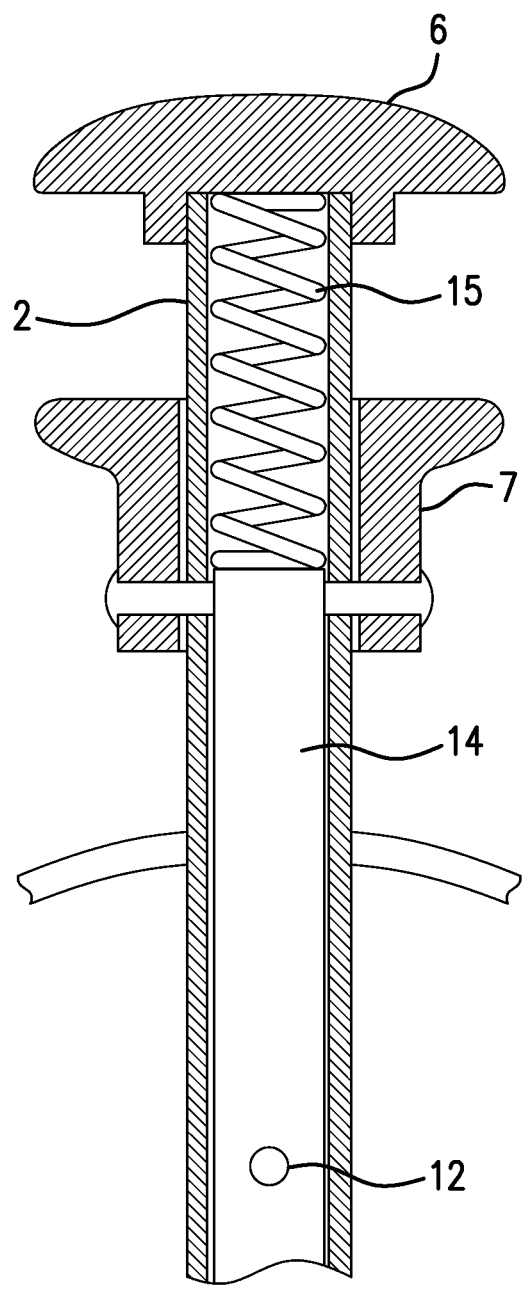
FIG. 2C is a sectioned side view of the selector lever shown in FIGS. 2A and 2B.

FIG. 2C shows a sectioned side view of the shaft 2 of the selector lever 1 shown in FIGS. 2A and 2B. As shown in FIG. 2C, the slide 7 may be connected to a connecting member 14 disposed internal to the shaft 2. The first and second detent pins 12, 13, (second detent pin 13 not shown in FIG. 2C), may be connected to the connecting member 14. Alternatively, the first and second detent pins 12, 13 may be directly connected to the slide 7. A biasing element 15, (e.g., a spring), may also be provided to bias the first and second detent pins 12, 13 into the respective slots.

Figure 2D:
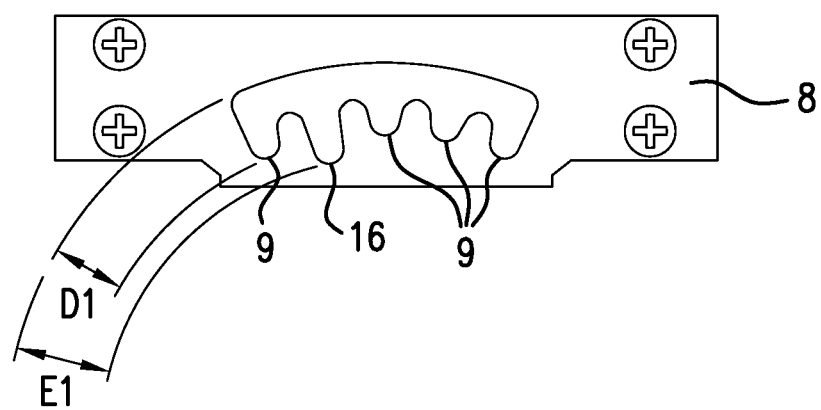
FIGS. 2D and 2E are side views of detent plates of the selector lever shown in FIGS. 2A and 2B.
Figure 2E:
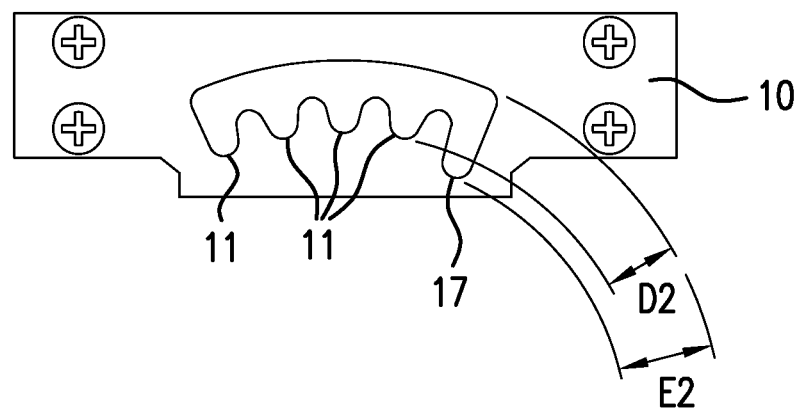

As shown in FIG. 2A, one or more of the first plurality of slots 9 may be configured as a first failure detection slot 16. FIGS. 2D and 2E show the first and second detent plates 8, 10, respectively, in greater detail. As shown in FIG. 2D, the first failure detection slot 16 is characterized by a first extended radial depth E1 that is greater than a first radial depth D1 of the remaining of the first plurality of slots 9. As further shown in FIG. 2E, one or more of the second plurality of slots 11 may be configured as a second failure detection slot 17, which is characterized by a second extended radial depth E2 that is greater than a second radial depth D2 of the remaining of the second plurality of slots 11. The "remaining" of the first or second plurality of slots 9, 11 is defined to include those of the slots that are not configured to be a failure detection slot. The "radial depth" is defined as the radial distance that would be travelled by the respective detent pin 12, 13 along the shaft 2, i.e., the change in distance from the pivot 4. For example, where one of the slots is set at an angle such that the insertion of the respective detent pin would require the simultaneous rotation of the shaft 2, the radial depth measures only the radial aspect of such movement. Similarly, the "extended radial depth" denotes that the failure detection slot has a radial aspect that is greater than the nominal radial depth of the plurality of slots in the same detent plate. In this example, the first and second extended radial depths E1, E2 are radially inward from the first and second depths D1, D2.

FIGS. 2A and 2B also show the location of a failure indicator 18. The failure indicator 18 is positioned on the shaft 2 to be concealed by the slide 7 until the first or section detent pins 12, 13 enters the first or second extended radial depth E1, E2 of one of the respective first or second failure detection slots 16, 17 (see FIGS. 5A and 5B). As further discussed below, the failure indicator 18 thereby provides a visual indication to the operator that one of the first or second detent pins 12, 13 has failed. The selector lever 1 may also comprise a normal indicator 19, positioned on the shaft 2 to be visible until the first or section detent pins 12, 13 enters the first or second extended radial depth E1, E2 of one of the respective first or second failure detection slots 16, 17.

Figure 3A:
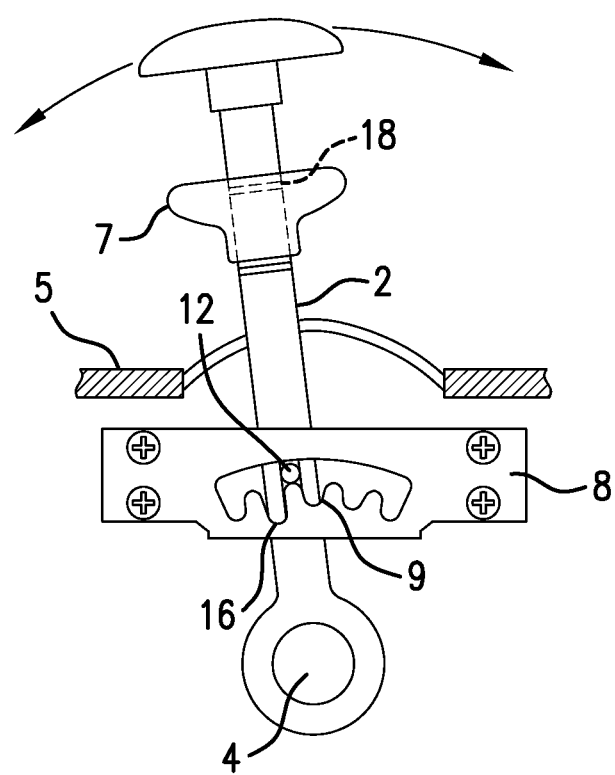
FIGS. 3A and 3B are opposing sectioned side views of the selector lever shown in FIGS. 2A and 2B in another position.
Figure 3B:
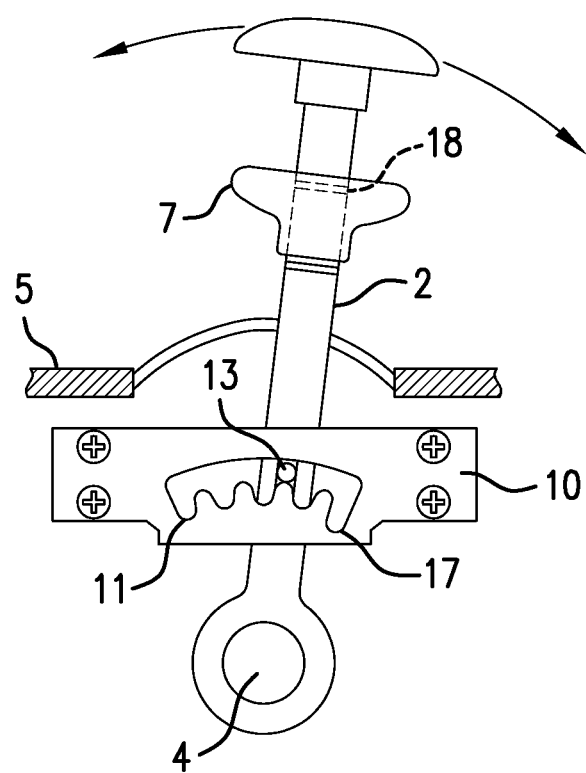
Figure 4A:
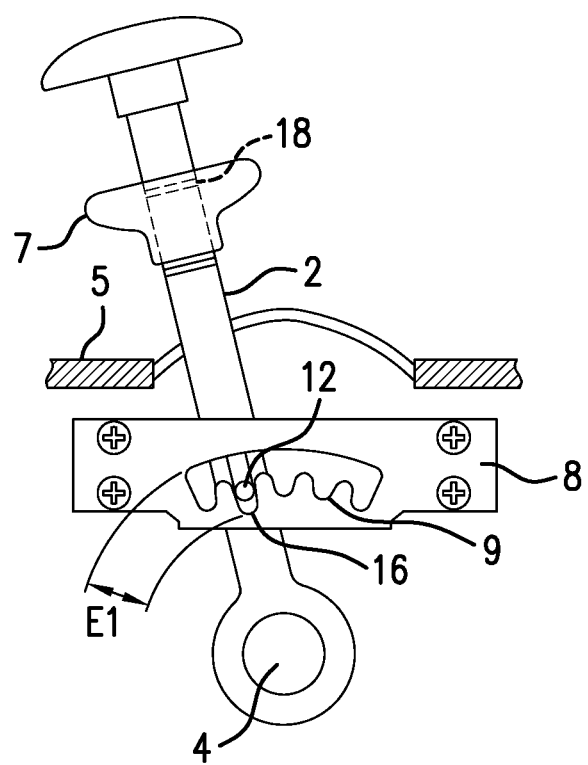
FIGS. 4A and 4B are opposing sectioned side views of the selector lever shown in FIGS. 2A and 2B in another position.
Figure 4B:
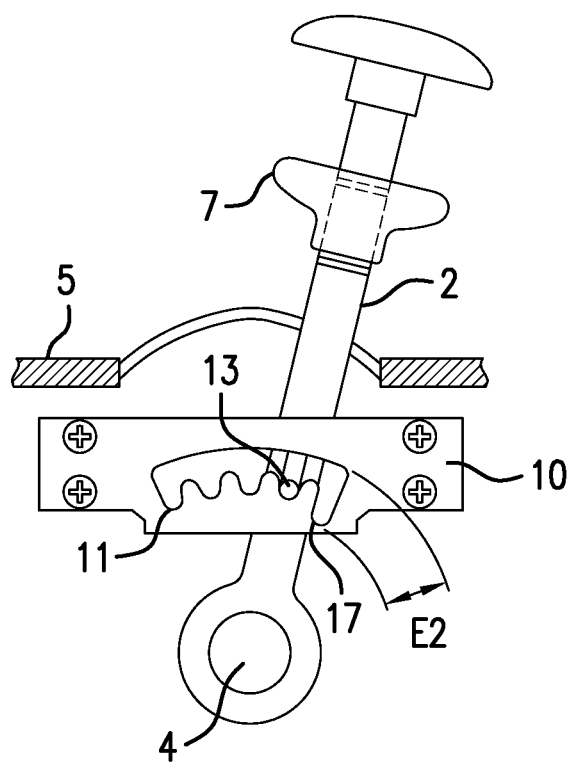

In operation, the operator moves the selector lever 1 from one position to another by first moving the slide 7 along the shaft 2 to disengage the first and second detent pins 12, 13 from the respective slot. FIGS. 3A and 3B illustrate the embodiment shown in FIGS. 2A and 2B with the pins 12, 13 disengaged from the slot as described. The normal indicator 19 remains visible in this position while the failure indicator 18 remains concealed. Next, the operator rotates the shaft 2 to the desired position. Then, the operator moves the slide 7 along the shaft 2 in a direction allowing the first and second detent pins 12, 13 to engage the desired slot. FIGS. 4A and 4B illustrate the selector lever 1 of FIGS. 2A and 2B, with the shaft 2 in the desired position with the first detent pin 12 engaging the first failure detection slot 16 and the second detent pin 13 engaging one of the remaining of the second plurality of slots 11. FIGS. 4A and 4B illustrate the selector lever 1 with at least the second detent pin 13 intact, wherein the first detent pin 12 enters the first failure detection slot 16, but does not enter the first extended radial depth E1. Accordingly, the failure indicator 18 remains concealed in FIGS. 4A and 4B.

Figure 5A:
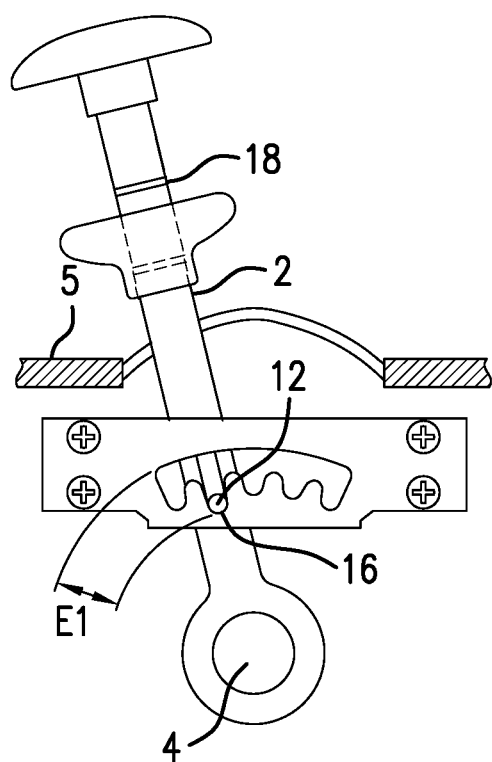
FIGS. 5A and 5B are opposing sectioned side views of the selector lever shown in FIGS. 2A and 2B in another position.
Figure 5B:
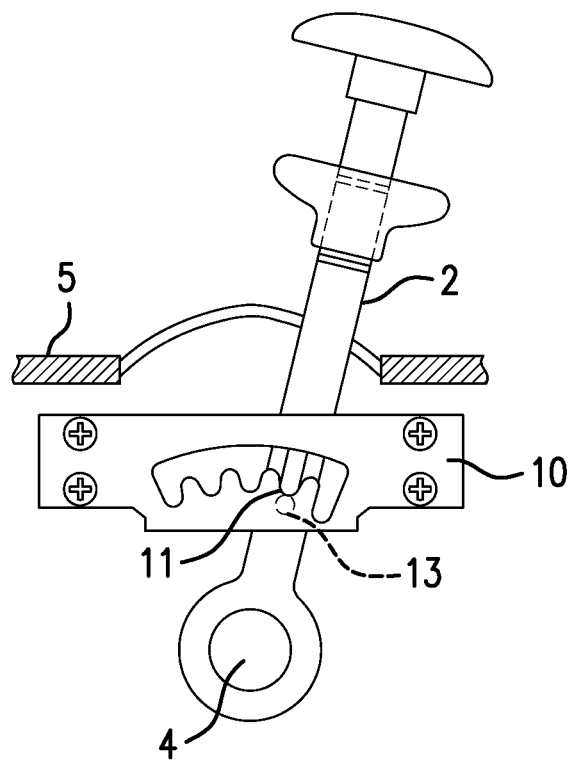

FIGS. 5A and 5B illustrate the selector lever 1 of FIGS. 2A and 2B, with the shaft 2 in the position shown in FIGS. 4A and 4B, where the second detent pin 13 has failed. Without the second detent pin 13 engaging the respective one of the second plurality of slots 11, the first detent pin 12 is biased by the biasing element 15, (see FIG. 2C), into the first extended radial depth E1 of the first failure detection slot 16. This position moves the slide 7 further along the shaft 2, exposing the failure indicator 18 and concealing the normal indicator 19. In a similar manner, a failure of the first detent pin 12 would allow the second detent pin 13 to be biased into the second extended radial depth E2 by the biasing element 15, (see FIG. 2C), when the shaft 2 is position to move the second detent pin 13 into the one or more second failure detection slot 17S. As may be apparent, each of the first and second failure detection slots 16, 17 should be arranged opposing one of the remaining of the respective plurality of slots 11, 9 in the opposing detent plate 10, 8.

As described above, the present disclosure provides a visual indication of a detent pin failure during the normal operation of the selector lever 1. The failure indication may be provided at one or more positions of the selector lever 1. For example, each incremental position of the selector lever 1, (for which a pair of corresponding slots has been provided, one in each detent plate), may include one first or second failure detection slot 16, 17. Also, the present disclosure provides a positive indication confirming that at least one of the detent pins remains intact.

Figure 6:
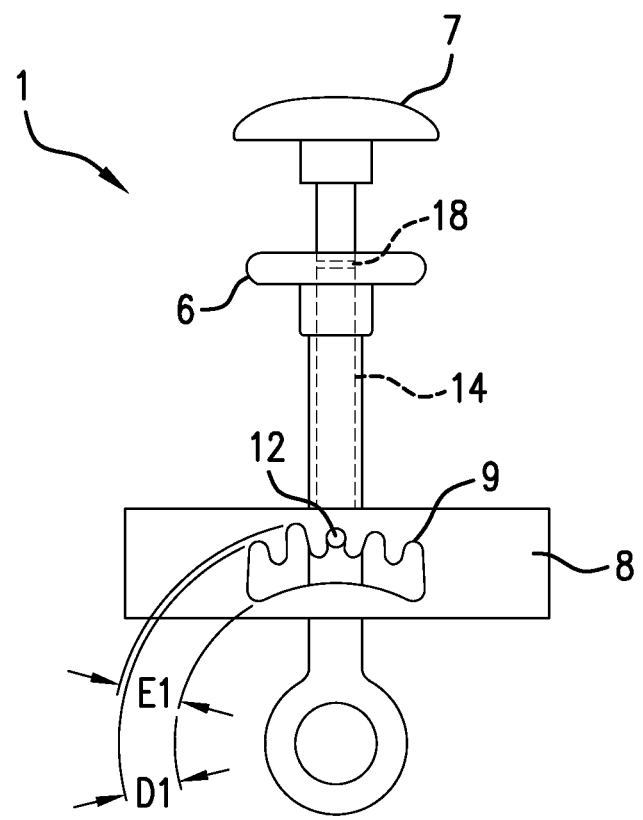
FIG. 6 is a sectioned side view of a selector lever according to another embodiment.

As those in the art will ascertain, the features described above are merely exemplary and may be provided in many forms to achieve some or all of the advantages herein. For example, FIG. 6 illustrates a sectioned side view of the selector lever 1 according to another example of the present disclosure, in which the direction moved by the first detent pin 12 to engage one of the first plurality of slots 9 is radially outward, i.e., away from the pivot 4. In contrast with the embodiment of FIGS. 2A and 2B, the slide 7 is moved in a radially inward direction to disengage the first detent pin 12 from the first detent plate 8. It follows that the first extended radial depth E1 is radially outward from the first radial depth D1 in this configuration. Also, in the embodiment shown in FIG. 6, the failure indicator 18 is disposed on the connecting member 14, normally concealed by the distal end 6 of the shaft 2.

Other configurations are also possible without departing from the scope of the present disclosure. For example, the selector lever may be provided with markings on the housing to indicate which of the first and second detent pins has failed in the event of a failure indication.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc., do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A selector lever, comprising:
   a shaft having a proximal end rotatably attached to a pivot, the pivot being disposed within a housing, the shaft having a distal end extending from the housing;
   a slide arranged to be movable along the shaft;
   a first detent pin operatively connected to the slide;
   a second detent pin operatively connected to the slide;
   a first detent plate disposed in the housing and having a first plurality of slots for receiving the first detent pin, each of the first plurality of slots having a first radial depth, at least one of the first plurality of slots comprising a first failure detection slot, the first failure detection slot defined by a first extended radial depth that is greater than the first radial depth;
   a second detent plate disposed in the housing and having a second plurality of slots for receiving the second detent pin, each of the second plurality of slots having a second radial depth, at least one of the second plurality of slots comprising a second failure detection slot, the second failure detection slot defined by a second extended radial depth that is greater than the second radial depth, wherein the first failure detection slot and the second failure detection slot are not intersected by a common line that is parallel to a rotational axis of the shaft;
   a normal condition in which neither the first detent pin nor the second detent pin have entered the first extended radial depth or the second extended radial depth, respectively;
   a failure condition in which one of the first detent pin or the second detent pin have entered the first extended radial depth or the second extended radial depth, respectively;
   a failure indicator comprising a marking positioned on the shaft and concealed by the slide in the normal condition and arranged to be exposed in the failure condition.

2. The selector lever of claim 1, further comprising a normal indicator that is exposed in the normal condition and concealed in the failure condition.

3. The selector lever of claim 1, further comprising a biasing element for biasing the slide towards the pivot.

4. The selector lever of claim 1, the selector lever forming part of an aircraft actuator system.

* * * * *